Figure 1:
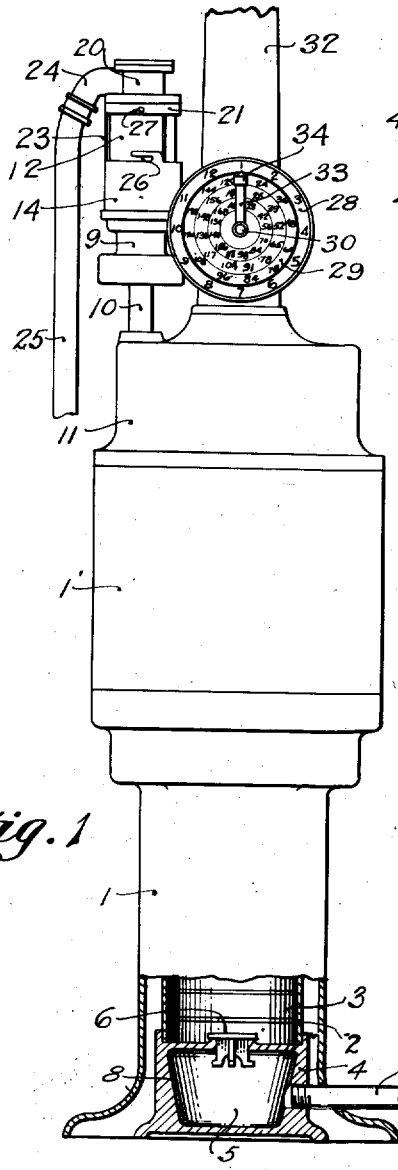

W. T. HATMAKER.

GASOLENE DISPENSING PUMP.

APPLICATION FILED MAR. 3, 1919.

Reissued Aug. 5, 1919.

14,702.

2 SHEETS—SHEET 1.

INVENTOR.

William T. Hatmaker

BY Cauwardsleed

ATTORNEY.

W. T. HATMAKER.
GASOLENE DISPENSING PUMP.
APPLICATION FILED MAR. 3, 1919.
Reissued Aug. 5, 1919.
14,702.
2 SHEETS—SHEET 2.
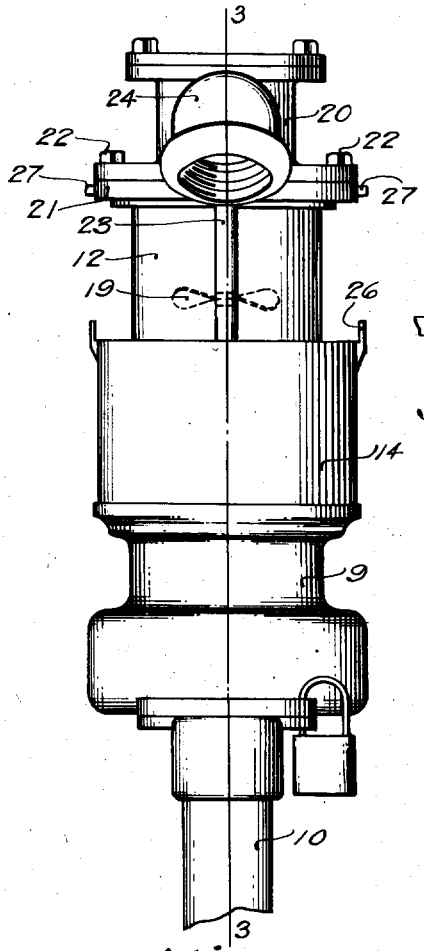
Fig. 2
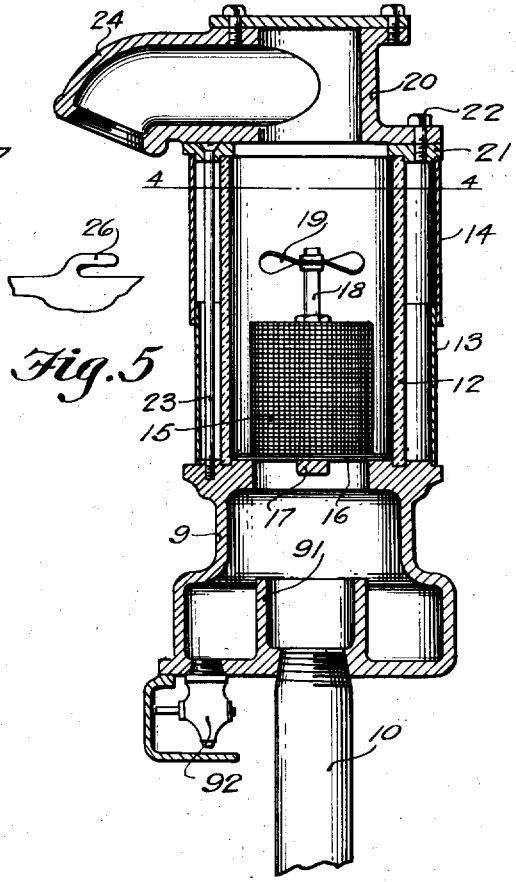
Fig. 3
Fig. 5
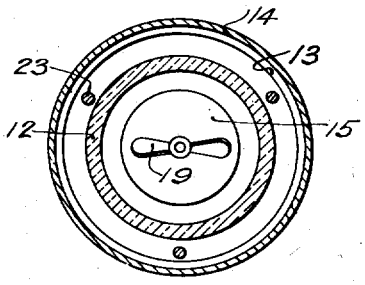
Fig. 4
INVENTOR.
William T. Hatmaker
BY Edward Reed
ATTORNEY.

UNITED STATES PATENT OFFICE.

WILLIAM T. HATMAKER, OF DAYTON, OHIO.

GASOLENE-DISPENSING PUMP.

14,702. Specification of Reissued Letters Patent. Reissued Aug. 5, 1919.

Original No. 1,287,985, dated December 17, 1918, Serial No. 222,867, filed March 16, 1918. Application for reissue filed March 3, 1919. Serial No. 280,493.

*To all whom it may concern:*

Be it known that I, WILLIAM T. HATMAKER, a citizen of the United States, residing at Dayton, in the county of Montgomery and State of Ohio, have invented a new and useful Gasolene-Dispensing Pump, of which the following is a specification.

This invention relates to dispensing pumps.

Much annoyance has been experienced by the purchasers of gasolene at filling stations because of the uncertainty of the amount of gasolene delivered by the dispensing apparatus. In certain types of dispensing apparatus the gasolene is delivered from the pump by means of a flexible tube or hose leading from the upper end of the discharge pipe, which is ordinarily extended some distance above the pump. At the end of the delivery stroke of the pumping apparatus, all gasolene within the flexible tube is delivered to the customer, but the gasolene in the discharge line, with which the tube is connected, will remain at that line and, if the next customer is to receive full measure upon the first stroke of the pumping mechanism, this discharge line must be full of gasolene at the beginning of that stroke. However, it frequently happens that there will be more or less leakage at the pump valves, and, if the pump stands idle for any considerable period of time, the gasolene will be drained either entirely or partly from the discharge line, and, in fact, sometimes the pumping cylinder itself will be partly emptied. Consequently, upon the next operation of the pump, the discharge line must be filled before any gasolene is delivered to the customer and, inasmuch as the discharge line will remain full of gasolene at the end of the pumping operation, it will be apparent that the delivery will be short just the amount of gasolene that was required to fill the discharge line at the beginning of the pumping operation. Further, it is desirable that the gasolene should be strained to remove impurities and, for this purpose, it is customary to provide a dispensing pump with a screen through which the gasolene passes. These screens, however, are frequently so arranged that they are very inaccessible and not only will the operator fail to detect the clogged or broken condition of the screen, but the difficulty of removing the screen frequently results in a clogged or damaged screen being allowed to remain in the pump.

To overcome these objections, one object of my invention is to provide the discharge line of a dispensing pump with means whereby the presence of liquid at or near the outlet end of said discharge line can be readily detected, either by the customer or by the inspector.

A second object of the invention is to so mount and arrange the screen or strainer that its condition can be readily determined, and that it can be readily removed for cleaning or renewal.

Other objects of the invention will appear as the invention is described in detail.

Figure 6:
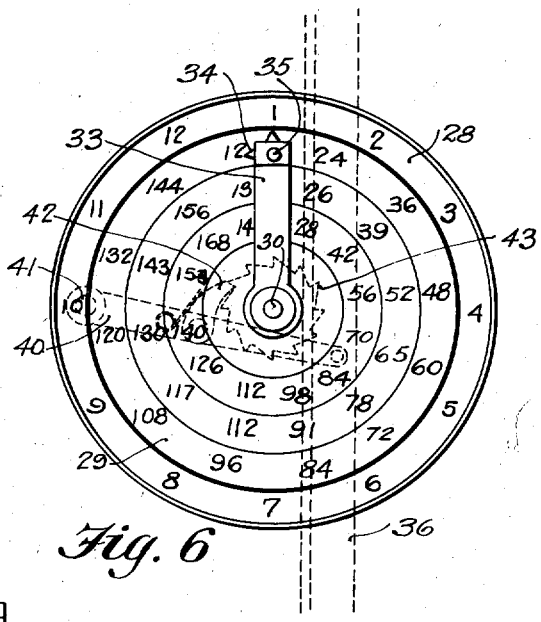
Figure 7:
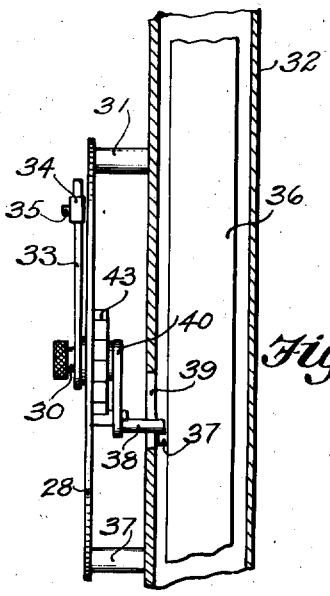

In the accompanying drawings Figure 1 is a vertical front elevation of a pump embodying my invention, partly broken away; Fig. 2 is an elevation of the upper portion of the discharge line; Fig. 3 is a sectional view taken on the line 3—3 of Fig. 2; Fig. 4 is a transverse sectional view taken on the line 4—4 of Fig. 3; Fig. 5 is a detail view of one of the fastening devices for the guard cylinder; Fig. 6 is a detail view of the computing dial; and Fig. 7 is a sectional detail view of the computing apparatus.

In these drawings I have illustrated one embodiment of my invention and have shown the same as applied to a gasolene dispensing pump, the main features of construction of which are well known, but it will be understood that this particular pump has been chosen for the purpose of illustration only, and that the invention, either in its present form or in a modified form, may be applied to dispensing pumps of various kinds, and which may handle various liquids. The particular pump here illustrated comprises a hollow stand or base 1 in which is mounted a pump cylinder 2 having therein a piston 3. This cylinder is mounted on, and its lower end is closed by, a supporting casting 4 having therein a chamber 5 which communicates with the cylinder through a suction controlled valve 6, which will open on the upward stroke of the piston and will be closed on the downward stroke of the piston. The cylinder communicates through the chamber 5 with a supply pipe, or inlet, 7, which leads from a suitable source of liquid supply, not here shown. Commercial gasolene usually contains more or less water, which has a tendency to separate from the gasolene and settle to the bottom of the chamber 5 when the gasolene is standing in the chamber. In cold weather this water will sometimes freeze, which results in injury or breakage to the pump. To avoid such injury, I have formed the walls 8 of the chamber 5 of an upwardly and outwardly flaring shape so that the freezing of the water therein will not injure the same. The pump operating mechanism is not here illustrated, but it may be of the usual or any suitable kind, and is located within an inclosing casing 1′ supported by the hollow stand 1.

The liquid is discharged from the pump through a suitable discharge line which extends upwardly therefrom and is connected at its upper end with a suitable conduit, such as a flexible tube, for conducting the liquid to the point of delivery. In the present construction this discharge line comprises a pipe 10 arranged in a substantially vertical position and extending above the pump mechanism. The construction and arrangement is such that this discharge line contains a relatively small number of joints and is, therefore, much less subject to leakage at the joints than are the ordinary discharge lines, which contain a multiplicity of joints. In order that it may be readily determined whether or not the discharge line contains liquid up to the discharge opening. I have provided means whereby the presence of liquid in the discharge line at or near the discharge end thereof can be readily detected. I prefer that this means should be in the nature of a sight opening formed in the discharge line through which the liquid therein can be seen and, in the present construction, I have interposed in the discharge line, between the end of the pipe 10 and the outlet for the discharge line, a casing or receptacle which is provided with a transparent wall and which forms a part of the discharge line. This casing or receptacle may take various forms and may be supported in different ways. But as here shown, I have mounted on the end of the discharge pipe 10 a supporting structure which is shown in the form of a head 9 screwed onto the end of the pipe 10 and having an opening in its upper wall to permit the liquid to pass therethrough. If desired, the head may be provided with an upwardly extending boss 91 surrounding the end of the pipe 10 and spaced from the side walls of the head to form a space within which sediment or other foreign matter may collect, and which is provided with an outlet controlled by a valve 92 through which the contents of the head may be drawn off. The casing is mounted on the supporting structure or head 9 and in that construction here shown this casing comprises a plain glass cylinder 12 which is seated on the supporting structure and may be secured thereto in any suitable manner. Preferably, a top plate 21 is placed in engagement with the upper end of the casing and is connected with the supporting structure or head 9 by means of bolts 23. This top plate 21 is provided with an opening of relatively large size and has mounted thereon a cap or head 20 which constitutes a closure for the casing. This head or closure is removably secured to the top plate 21 by means of screws 22 so that it can be removed to permit access to be had to the interior of the casing without interfering with the supporting devices for the casing. The closure or head 20 is provided with an outlet which is here shown as a laterally extending discharge spout or nozzle 24, to which the flexible tube or hose 25 may be connected. At the end of the delivery stroke of the pump the liquid will drain through the tube 25 down to the level of the lower edge of the outlet opening and the discharge line will remain filled. The presence of this liquid in the discharge line can be readily detected through the transparent walls of the casing. Thus, the customer or an inspector can readily determine before the pumping operation begins whether or not the discharge line is filled with liquid.

As has been stated, it is customary to provide liquid dispensing pumps with a screen or strainer to remove solid impurities from the liquid, and in order that this screen may be readily accessible and that its condition may be readily determined, I prefer to mount the same within the casing 12. It may be supported therein in any suitable manner and may be of any suitable size of shape. In the present construction the screen is shown at 15 as cylindrical in form and of a diameter and length considerably less than the diameter and length of the cylindrical casing. The screen is mounted on a supporting frame 16 which in turn is carried by a spider or frame 17 extending across the opening in the upper end of the head 9. The spider and frame 16 are of such a character as to leave the lower end of the screen open so that the liquid passing from the head 9 will enter the screen and pass outward through the walls thereof. The screen may be secured in position in any desired manner, but in the present construction a shaft 18 extends through the upper end thereof and serves to retain the same in position on the supporting frame 16. It will be apparent, therefore, that the screen may be readily inspected through the transparent walls of the casing 12 and that it may be removed for cleaning or renewal by simply removing the closure or head 20, detaching the screen and withdrawing it through the upper end of the casing 12. Because of the relatively short length of the screen, it does not interfere with the visibility of the liquid in the casing or prevent the presence of liquid therein from being determined by the customer.

Gasolene and many other liquids are more or less colorless and, in order that the passage of liquid through the casing 12 may be more readily detected, there may, if desired, be arranged within the casing 12 a movable device which will be actuated by the movement of the liquid and which will, by its movement, clearly indicate that the liquid is passing through the casing. In the present construction this device takes the form of a small spinner or vane 19 which is revolubly mounted on a suitable support between the end of the screen and the upper end of the casing. In the particular arrangement here illustrated, the vane is revolubly mounted on the upper end of the shaft 18 which projects above the screen 15. The propeller like blades of the vane respond very quickly to even a slight movement of the liquid in the casing, and the vane will begin to rotate immediately upon the commencement of the pumping operation, provided the discharge line is full of liquid. It is desirable that some means should be provided to protect the transparent casing against injury, either accidental or malicious, and I have, therefore, surrounded the same by a guard, which is here shown as a two-part cylindrical casing, the two parts 13—14 of which are adapted to telescope one upon the other. This guard is supported by the outer edge portion of the supporting structure or head 9 and when the pump is in use the upper portion of the guard is in its lower or telescoping position so that the upper part of the casing 12 is exposed to view. When the pump is not in use, the upper portion of the guard may be elevated and secured in its elevated position, this being accomplished in the present instance by means of hook-shaped projections, or slotted lugs, 26, arranged on the opposite sides thereof and adapted to engage pins or lugs 27 secured to the opposite sides of the top plate 21.

I also prefer to provide the pump with a computing device, by means of which the quantity of gasolene delivered and the price thereof may be readily ascertained, and such a device is shown in Figs. 1, 6 and 7 of the drawings. The device may take various forms but, in the construction here illustrated, it comprises a dial made up of a plurality of parts arranged one within the other. The outer portion 28 of the dial has thereon figures representing units of measurement, such as gallons, and in the present instance it is provided with the figures 1 to 12. Arranged within the portion 28 of the dial is a removable dial portion 29 which consists of a series of concentric spaces containing numerals which are arranged in substantially radial alinement with the quantity-indicating numerals on the portion 28 of the dial and which indicate the price of the corresponding quantities of gasolene at different prices per gallon. The price of gasolene and other commodities is, of course, subject to fluctuation, and the price dial 29 is here shown as containing figures which represent the price of the several quantities of gasolene at three different prices per gallon, and the dial is removable to permit it to be replaced by a different dial if the price fluctuates beyond the limits of the figures thereon. These dials are mounted about a shaft 30 and are held in fixed positions by studs 31 which project from the arm 32 which extends above the pump and is usually provided with a lamp, (not here shown) which may be illuminated at night. Obviously, however, the computing device may be supported in any convenient place. The shaft 21 has mounted thereon a pointer or index arm 33 which moves over the face of the dials 28 and 29 to indicate the quantity and price of the gasolene delivered. The arm 33 is tapered at its outer end to point to the gasolene indications, and is provided with a lateral indicator 34 which points to the prices. This indicator 34 may be moved along the arm 33 to point to the different series of figures, and may be secured in adjusted positions by means of a binding screw 35 which passes through the same and into engagement with the arm 33. The indicator arm 33 may be operated from any suitable movable part of the pumping mechanism, but is here shown as operated from the rack bar 36 which is connected with and extends above the piston rod of the piston 3, not here shown. This rack bar is reciprocated in the well known manner when the pump is operated, it not being thought necessary to illustrate the details of this well known mechanism. The rack bar 36, when elevated, moves up into the hollow extension or arm 32 upon which the dial is mounted. Upon the rack bar 36 is mounted a lug 37, in the path of which is arranged a pin 38 which projects through an opening 39 in the side of the extension 32, and which is connected with a crank arm 40 which is pivoted at 41 and carries a pawl 42 which engages a ratchet wheel 43 on the shaft 30 of the pointer 33 (see Fig. 6). It will be seen that as the rack 36 is elevated and lowered in the operation of the pump, the lug and pin 37 and 38 will coöperate to cause the arm 33 to move to the proper indications of the quantity of liquid discharged and the price therefor, it being understood that the movement of the rack bar 36 corresponds in the extent of its movement with the indications of the quantity of oil discharged in each operation, that is, if the cylinder discharges a gallon of oil upon each operation thereof, the rack bar will move a distance sufficient to cause the indicator arm 33 to be advanced one full unit of measurement on the dial.

While I have shown and described one embodiment of my invention, I wish it to be understood that I do not desire to be limited to details thereof, as obvious modifications will occur to a person skilled in the art.

Having now fully described my invention, what I claim as new and desire to secure by Letters Patent is:

1. In an apparatus of the character described, a liquid measuring device comprising means to discharge the liquid therefrom, a discharge line leading upwardly from said measuring device, and means arranged near the discharge end of said line to indicate the presence of liquid in said line at that point.

2. In an apparatus of the character described, a liquid measuring device comprising means to discharge the liquid therefrom, a discharge line leading upwardly from said measuring device, said discharge line having a sight opening near the discharge end thereof, said opening being so arranged that the liquid will be visible therethrough only when said discharge line is full up to that point.

3. In an apparatus of the character described, a liquid measuring device comprising means to discharge the liquid therefrom, a discharge line leading upwardly from said measuring device, a casing connected with said discharge line, and having a discharge opening, said casing also having transparent walls, and being so arranged that it will contain liquid only when said discharge line is full.

4. In an apparatus of the character described, pumping mechanism comprising a discharge line, a casing connected at its lower end with said discharge line and having a discharge opening at its upper end, whereby said casing will contain liquid only when said discharge line is full, said casing having a transparent wall.

5. In an apparatus of the character described, pumping mechanism having a vertically arranged discharge pipe, and a casing having its lower end connected with said discharge pipe, forming an extension thereof and having an outlet at its upper end, said casing having a transparent wall.

6. In an apparatus of the character described, a pump comprising a cylinder, a discharge pipe extending upwardly from said cylinder, a supporting structure mounted on the end of said discharge pipe, a casing supported on said structure and having transparent walls, and a closure for the upper end of said casing, said closure having a discharge opening.

7. In an apparatus of the character described, a pump comprising a cylinder, a discharge pipe extending upwardly from said cylinder, a supporting structure mounted on the end of said discharge pipe, a transparent cylinder mounted on said supporting structure, and a closure for the upper end of said transparent cylinder, and means for connecting said closure with said supporting structure, said closure having a discharge opening.

8. In an apparatus of the character described, a liquid measuring device comprising means to discharge the liquid therefrom, a discharge line leading upwardly from said measuring device, and having a sight opening near the discharge end thereof, and a screen arranged in the path of the liquid in said discharge line adjacent to said sight opening.

9. In an apparatus of the character described, pumping mechanism comprising an upwardly extending discharge line, a casing connected at its lower end with said discharge line and having a discharge opening at its upper end, said casing having a transparent wall and a screen mounted in said casing in the path of the liquid passing through the same.

10. In an apparatus of the character described, an upwardly extending discharge pipe, a supporting structure mounted on the upper end of said discharge pipe, a transparent casing mounted on said structure in open communication with said discharge pipe and having an outlet, a screen mounted in the path of the liquid in said casing, a removable closure for said casing to permit access to said screen, and separate means for securing said casing on said structure, and for securing said closure to said casing, whereby the closure may be removed without releasing the casing.

11. In an apparatus of the character described, an upwardly extending discharge pipe, a supporting structure mounted on the upper end of said discharge pipe, an open ended transparent casing mounted on said supporting structure, a top plate engaging the upper end of said casing, means for connecting said top plate with said supporting structure, a closure removably secured to said top plate and having a discharge opening, and a screen supported within said casing in the path of the liquid passing therethrough.

12. In an apparatus of the character described, an upwardly extending discharge pipe, a supporting structure mounted on the upper end of said discharge pipe, an open ended transparent casing mounted on said supporting structure, a top plate engaging the upper end of said casing, means for connecting said top plate with said supporting structure, a closure removably secured to said top plate and having a discharge opening, and a screen mounted on said supporting structure within said casing and arranged in the path of the liquid passing through the casing.

13. In an apparatus of the character described, a liquid measuring device comprising means to discharge the liquid therefrom, a discharge line leading upwardly from said measuring device and having a sight opening near the upper end thereof, and a movable device mounted in the path of the liquid through said discharge line adjacent to said sight opening.

14. In an apparatus of the character described, pumping mechanism comprising an upwardly extending discharge line, a casing connected at its lower end to the upper end of said discharge line and having a discharge opening at its upper end, said casing having a transparent wall, and a movable vane mounted in said casing in the path of the liquid passing through the same.

15. In an apparatus of the character described, pumping mechanism comprising an upwardly extending discharge line, a casing connected at its lower end to the upper end of said discharge line and having a discharge opening at its upper end, said casing having a transparent wall, and a vane mounted for rotation about a vertical axis and arranged in the path of the liquid passing through said casing.

16. In an apparatus of the character described, pumping apparatus comprising an upwardly extending discharge line, a casing connected at its lower end to the upper end of said discharge line and having a discharge opening at its upper end, said casing having a transparent wall, a screen mounted within said casing near one end thereof, and a vane movably mounted in said casing between said screen and the other end of said receptacle.

17. In an apparatus of the character described, pumping mechanism comprising an upwardly extending discharge line, a casing connected at its lower end to the upper end of said discharge line and having a discharge opening at its upper end, said casing having a transparent wall, a screen mounted in said casing in the path of the liquid passing through the same, a shaft extending above said screen, and a vane rotatably mounted on said shaft.

18. The combination with a gasolene dispensing pump, of a single continuous discharge pipe connected to said pump, a head connected to the discharge end of said pipe and forming a passage for the gasolene, a screen mounted on said head in a position to receive the gasolene therefrom, a transparent cylinder surrounding said screen, the lower end of said transparent cylinder having a sealed connection with said head, a plate with which the upper end of said transparent cylinder also has a sealed connection, and a discharge head mounted on said plate and adapted to be removed therefrom to permit the screen to be removed without disturbing the sealed connections of the transparent cylinder.

19. In a gasolene dispensing pump, the combination with the pump cylinder, and a discharge pipe receiving the gasolene therefrom, of a head into which said pipe discharges, a screen mounted on said head and receiving the gasolene therefrom, a transparent cylinder inclosing said screen and providing space thereabove through which the gasolene passes from the screen, and a vane within said space in the path of the gasolene and adapted to be set in motion thereby.

20. In a gasolene dispensing pump, the combination with a pump cylinder, and a discharge pipe receiving the gasolene therefrom, of a head to receive the gasolene from said pipe, a screen mounted on said head and receiving the gasolene therefrom, a transparent cylinder surrounding said screen and extending thereabove, the lower end of said transparent cylinder having a sealed connection with said head, an apertured plate with which the upper end of said transparent cylinder has a sealed connection, and a discharge head mounted on said plate.

21. In a gasolene dispensing pump, the combination with a pump cylinder and a discharge pipe, of a head receiving the gasolene from said discharge pipe, a screen mounted on said head in the path of the gasolene, a transparent cylinder the lower end of which has a sealed connection with said head, a plate with which the upper end of said transparent cylinder has a sealed connection, an imperforate stationary cylinder mounted on said head and inclosing the lower portion of said transparent cylinder, and a movable imperforate cylinder adapted to be supported by said plate when elevated to conceal the upper portion of said transparent cylinder, and to be lowered to expose the upper portion of said transparent cylinder.

In testimony whereof I affix my signature hereto.

WILLIAM T. HATMAKER.